US008238653B2

(12) United States Patent
Tajbakhsh et al.

(10) Patent No.: US 8,238,653 B2
(45) Date of Patent: Aug. 7, 2012

(54) METHODS AND MECHANISMS FOR PROBABILISTIC COLOR CORRECTION

(75) Inventors: Touraj Tajbakhsh, Hamburg (DE); Arnold Neugebauer, Hannover (DE)

(73) Assignee: Silicon Image, Inc., Sunnyvale, CA (US)

( * ) Notice: Subject to any disclaimer, the term of this patent is extended or adjusted under 35 U.S.C. 154(b) by 1051 days.

(21) Appl. No.: 12/172,187

(22) Filed: Jul. 11, 2008

(65) Prior Publication Data

US 2010/0008573 A1    Jan. 14, 2010

(51) Int. Cl.
*G06K 9/00*    (2006.01)
*G06K 9/38*    (2006.01)

(52) U.S. Cl. .................................. 382/167; 382/272

(58) Field of Classification Search .................. 382/162, 382/167, 272, 274, 224, 225, 228; 345/589, 345/690; 702/104
See application file for complete search history.

(56) References Cited

U.S. PATENT DOCUMENTS

| | | | |
|---|---|---|---|
| 7,190,384 B2 | 3/2007 | Imai | |
| 7,859,554 B2 * | 12/2010 | Young | 345/690 |
| 2005/0057674 A1 | 3/2005 | Krymski et al. | |
| 2006/0177128 A1 | 8/2006 | Raghupathy et al. | |
| 2007/0043527 A1 * | 2/2007 | Quan et al. | 702/104 |
| 2008/0055476 A1 | 3/2008 | Shehata et al. | |
| 2008/0055479 A1 | 3/2008 | Shehata et al. | |
| 2008/0056566 A1 | 3/2008 | Shehata et al. | |
| 2008/0056605 A1 | 3/2008 | Shehata et al. | |

FOREIGN PATENT DOCUMENTS

WO  WO 2006/092559 A1   9/2006
WO  WO 2007/070502 A3   6/2007

OTHER PUBLICATIONS

Finlayson, Graham D., et al., "Constrained least-squares regression in color spaces", *Journal of Electronic Imaging*, vol. 6, (Oct. 1997), 484-493.

Zhou, Jianping, "Gray-Preserving Color Correction without Exposure Value Information", *SPIE-IS&T/* vol. 6807 68070Q-1, (Jan. 2008), Whole Document.

Barnard et al., "A Comparison of Computational Color Constancy Algorithms—Part I: Methodology and Experiments with Synthesized Data", IEEE Transactions on Image Processing, vol. 11, No. 9, Sep. 2002.

Finlayson et al., "Color by Correlation: A Simple, Unifying Framework for Color Constancy", IEEE Transactions on Pattern Analysis and Machine Intelligence, vol. 23, No. 11, Nov. 2001.

Bianco et al., "A New Method for RGB to XYZ Transformation Based on Pattern Search Optimization", IEEE Transactions on Consumer Electronics, vol. 53, No. 3, pp. 1020-1028, Aug. 2007.

* cited by examiner

*Primary Examiner* — Yon Couso
(74) *Attorney, Agent, or Firm* — Blakely Sokoloff Taylor & Zafman, LLP

(57) ABSTRACT

Methods and systems to determine a probability that a given illumination is a reference illumination. In an embodiment, data representing a set of respective captures of reference targets under a reference illumination may be used to generate a probability distribution for the reference illumination. In another embodiment, one or more such probability distributions, each corresponding to a respective reference illumination, may be used in estimating a non-reference illumination.

29 Claims, 8 Drawing Sheets

METHODS AND MECHANISMS FOR PROBABILISTIC COLOR CORRECTION

BACKGROUND OF THE INVENTION

1. Field of the Invention

Embodiments of the invention relate generally to the processing of image data. More particularly, an embodiment of the invention calculates probability information for use in determining a color correction for image data.

2. Background Art

Unlike human vision, imaging devices such as digital cameras can not adapt their spectral responses to cope with different lighting conditions. The original appearance of a scene captured by an imaging device under a particular illumination can be recovered by transforming output of the imaging device—e.g. image information represented in a red/green/blue (RGB) color space or in a luma/blue chroma/red chroma ($YC_bC_r$) color space. Such transformations typically use chromatic adaptation models, and are the basis of several existing color balancing methods. These models provide a transformation from tristimulus values in one viewing condition into tristimulus values corresponding to a second viewing condition. Existing chromatic adaptation models vary in how the particular values of transformation coefficients are obtained, but they are typically based on the Von Kries hypothesis, which states that chromatic adaptation is an independent gain regulation of the three large, medium and small (or LMS) cone signals through three different gain coefficients. In these models the RGB channels are usually considered as an approximation of the LMS retinal wavebands, so that the post-adaptation RGB values can be obtained with a Von Kries diagonal transform utilizing three gains only. However, this type of modeling may not hold true for a given imaging device.

Often, an imaging device will have for each color channel (e.g. red, green, blue) its own characteristic spectral response across a range of the light spectrum, e.g. a response which does not sufficiently conform to assumptions made for a given chromatic adaptation model. Furthermore, when such an imaging device captures an image of a target under a particular viewing condition, often there is inadequate information about the particular viewing condition for use in image processing. The anomalous spectral responses of imaging devices and the limited availability of information about viewing conditions under which images are captured may limit the effectiveness of existing methods of image processing such as color correction.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
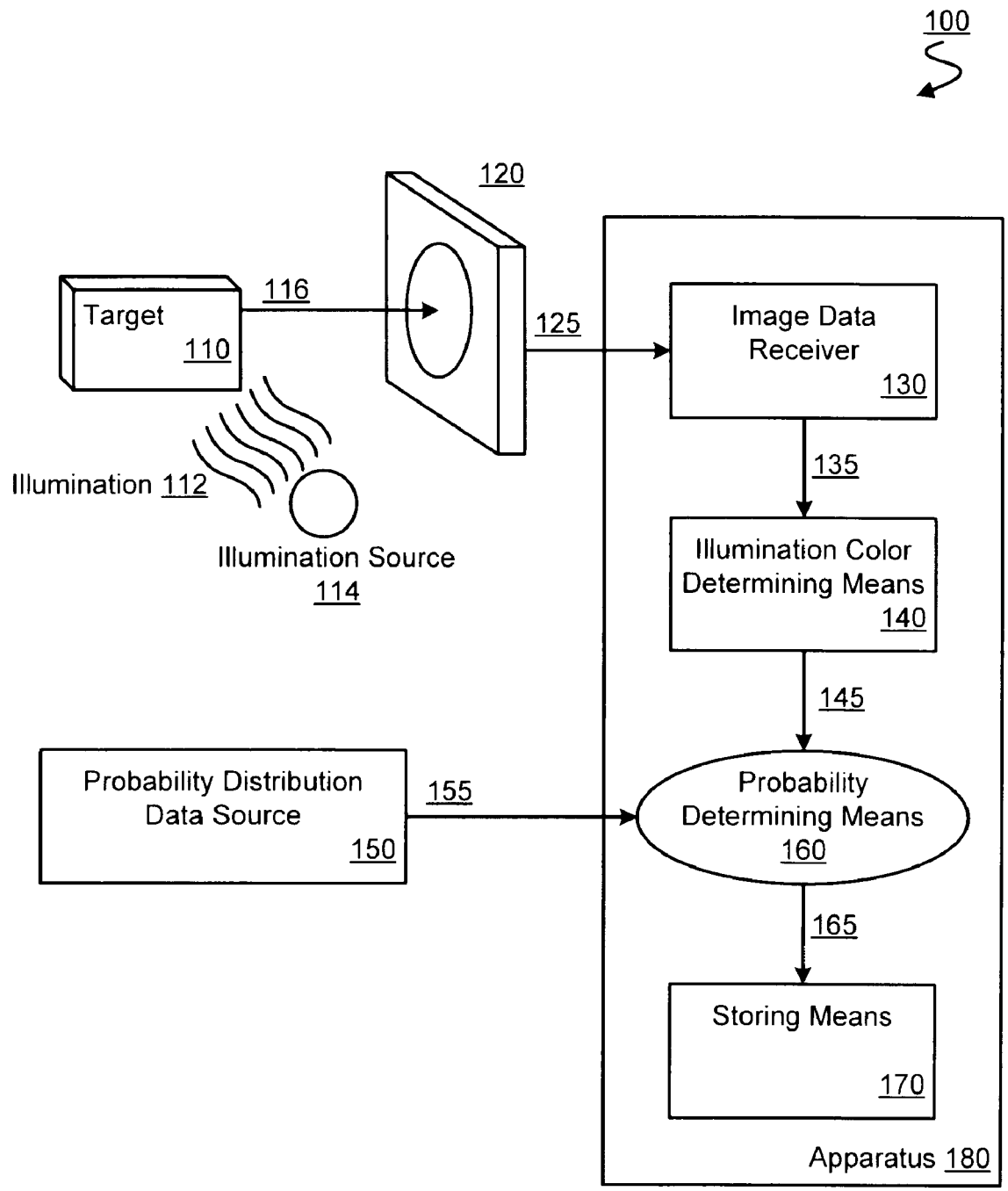
FIG. 1 is a block diagram illustrating select elements of a system for determining illumination probability information according to an embodiment.

FIG. 1 illustrates select elements of a system 100 for determining illumination probability information according to an embodiment. System 100 may include an apparatus 180 to obtain image data 125 from a capture 116 performed by an imaging device 120. Imaging device 120 may include any of a variety of cameras, video recorders or other similar devices capable of generating digital image data. As used herein, "capture" is understood to refer to an operation of an imaging device which results in the generation of image data representing an image of a target 110. As used herein, a capture of a target "under an illumination" refers to the generation of image data representing an image of the target when the target is exposed to the particular illumination. The image data 125 may, for example, represent an image of target 110 exposed to an illumination 112, e.g. by an illumination source 114.

Apparatus 180 may include an image data receiver 130 to receive the image data 125. In an alternative embodiment, some or all of the functionality of imaging device 120 may be incorporated into apparatus 180. Image data receiver 130 may in various embodiments incorporate various levels of image data storing and/or pre-processing functionality to operate on data 125 depending, for example, on a format of received image data 125 and/or the extent to which any functionality of imaging device 120 may be incorporated into apparatus 180. Image data receiver 130 may provide output 135 to illumination color determining means 140 based on image data 125 and on any preprocessing of image data 125 which is performed.

Illumination color determining means 140 may include any of a variety of combinations of hardware and/or software implemented component means to determine an illumination color 145 of the image data 125. As used here, an "illumination color" of an image is understood to refer to an average color value calculated for a plurality of color values of a region of the image—e.g. three per-color-channel averages calculated for a plurality of tristimulus values of pixels in at least part of the image. By way of non-limiting example, illumination color determining means 140 may include an application-specific integrated circuit (ASIC), a field-programmable gate array (FPGA), an erasable programmable read-only memory (EPROM) and/or similar hardware device and/or an execution of stored instructions by one or more processors. A calculated illumination color of an image may be used to determine a white-point. As used herein, "white point" is understood to refer to a chromaticity, usually represented by two values in a chromaticity space, which corresponds to an illumination "white" of a captured image which has equal energy light reflecting properties over the visible spectrum. In an embodiment, a determining of a white point may be based on the "gray-world assumption" that, given an image with sufficient color variations, the average reflected color in the image is achromatic, i.e., has a particular gray value.

In an embodiment, illumination color determining means 140 may provide illumination color information 145 to probability determining means 160, which may determine an illumination probability associated with image data 125. As with illumination color determining means 140, probability determining means 160 may include any of a variety of hardware and/or software implemented component means, such as an ASIC, FPGA, EPROM and/or similar hardware device and/or an execution of stored instructions by one or more processors. In an embodiment, probability determining means 160 may access a probability distribution data source 150 to receive illumination probability distribution data 155. Probability distribution data source 150 may include any of a variety of devices or systems for exchanging data describing a probability distribution associated with a particular illumination—referred to herein as illumination probability distribution data. In various embodiments, probability distribution data source 150 may further include memory (not shown) to store illumination probability distribution data and/or one or more data processing units (not shown) to compute illumination probability distribution data. In an alternative embodiment, some or all of the functionality of probability distribution data source 150 may be incorporated into apparatus 180. By way of non-limiting example, the data processing functionalities of one or more of image data receiver 130, illumination color determining means 140, probability distribution data source 150 and probability determining means 160 may, in an embodiment, be implemented by respective executions of instructions by the same data processor(s) of apparatus 180.

Based on the illumination color information 145 and illumination probability distribution data 155, probability determining means 160 may, for example determine a white point of image 125 and a probability that illumination 112 is a known illumination associated with illumination probability distribution data 155. Probability determining means 160 may store an indication 165 of the determined probability in a storage means 170 such as a register, cache, random access memory (RAM), and/or any of a variety of similar data storage devices.

Insofar as system 100 may analyze image data 125 with reference to illumination probability distribution data 155, for example, the descriptions of embodiments herein include various references to "reference target", "reference illumination", "reference white point", etc., which may be variously used to make determinations associated with a "non-reference target", "non-reference illumination", and/or "non-reference white-point", etc. In an embodiment, a set of reference information may be generated to profile characteristics of an imaging device in capturing images of known reference targets under one or more known reference illuminations. The set of reference information—e.g. including reference illumination probability distribution data—may be used to make determinations about the conditions under which another (or the same) imaging device has captured "non-reference" image data. Reference illumination probability distribution data may include, for example, data describing a transformation applied to a data set and/or data indicating a probability distribution of the transformed data set.

Figure 2:
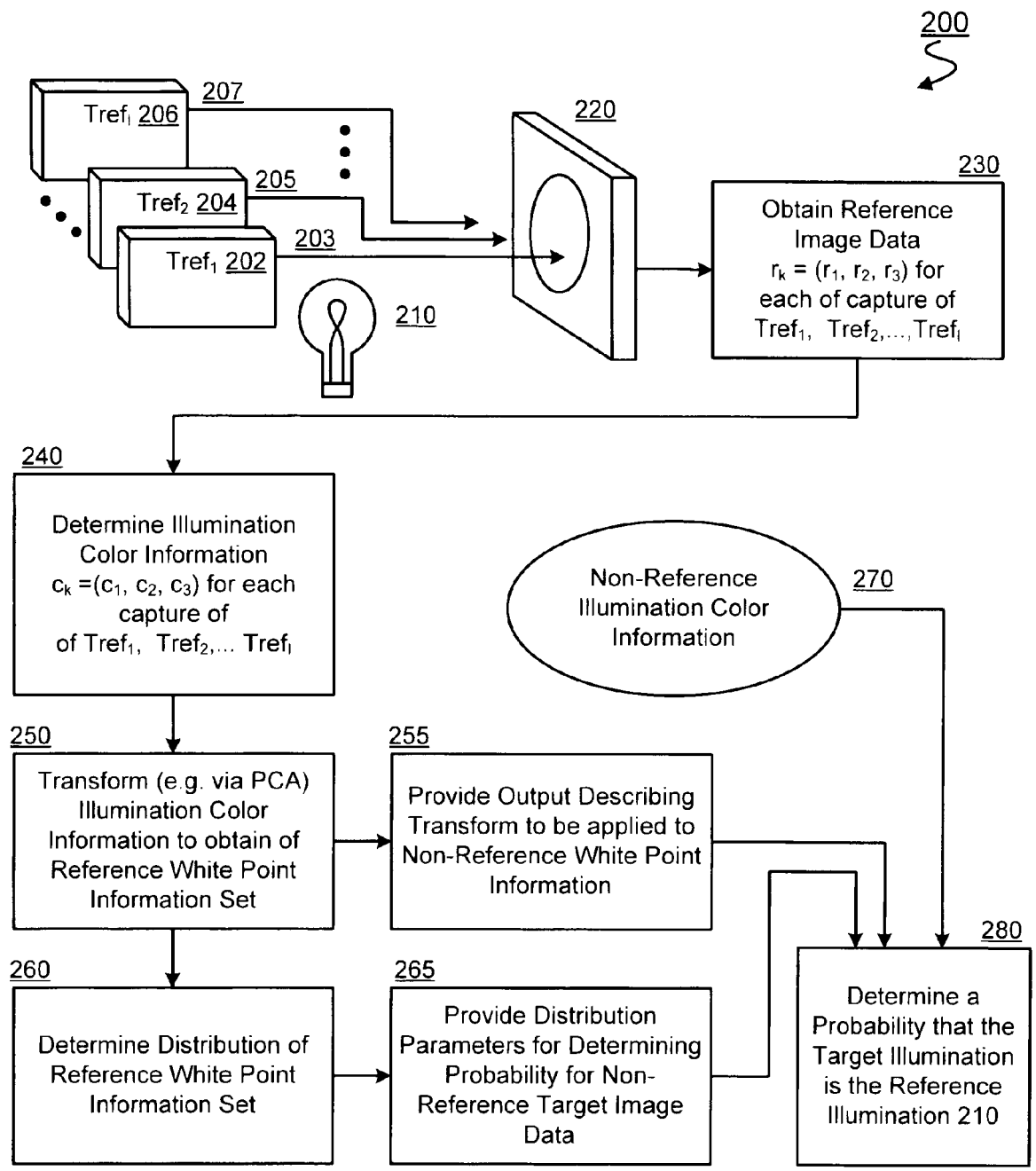
FIG. 2 is a flow diagram illustrating select elements of a process for providing illumination probability distribution information according to an embodiment.

FIG. 2 illustrates select elements of a process 200 for generating reference data according to an embodiment. The process 200 may generate data such as illumination probability distribution data 155, for example. By way of non-limiting example, the generation of illumination probability distribution data according to process 200 may be performed by one or more data processing units of probability distribution source 150 or of an apparatus such as apparatus 180.

According to process 200, image data is obtained which represents a number I of captures 203, 205, . . . , 207—each capture of an image of a respective one of reference targets Tref$_1$ 202, Tref$_2$, 204, . . . Tref$_I$ 206—by an imaging device 220, each capture under a known reference illumination 210. The illumination may be described by spectral emittance characteristics and/or defined according to any of a variety of known illumination standards. By way of non-limiting example, illumination 210 may be illuminant A (tungsten-filament lighting), illuminant B (noon sunlight), illuminant C (average day light), or one of illuminants F1 to F12 (fluorescent lighting), as defined in the *CIE Standard Illuminants for Colorimetry*, ISO 10526:2007, Commission Internationale de L'Eclairage, December, 2007.

In an embodiment of the invention, the obtained image data may be generated from actual captures 203, 205, . . . 207 by an actual imaging device 220. The set of data generated by capture 203 may include one or more image tristimuli, each image tristimuli $r=(r_k)_{k=1,\ldots,3}=(r_1, r_2, r_3)$ containing three channel responses $r_1$, $r_2$, $r_3$ (also denoted as a pixel). A 3D tensor R, including a plurality of image tristimuli r structured in a two-dimensional grid, represents a region (e.g. one or more pixels) of the captured image of a reference target, e.g. Tref$_1$ 202. More particularly, a particular image value r for a particular region of the captured image may indicate a spectral response $r_k$ of imaging device 220 in each of color channels k=1, 2, 3. In an embodiment, r is an RGB pixel $(r_1, r_2, r_3)$. In an embodiment, an image value r may be a pixel value.

Alternatively or in addition, obtained image data may be generated based on a modeling of known spectral characteristics of a type of imaging device. For example, an image region R of a multispectral target $B_i(\lambda)$ under illumination $L_j$ may be simulated by:

$$R_{i,j,k} = \sum_\lambda B_i(\lambda) L_j(\lambda) S_k(\lambda) \tag{1}$$

$$k = 1, \ldots, 3$$

where $B_i(\lambda)$ represents a reflection of light at wavelength $\lambda$ from a region of a multispectral image, $L_j(\lambda)$ represents a contribution of light at wavelength $\lambda$ by illumination $L_j$, and $S_k(\lambda)$ represents a sensitivity of a color channel k of the modeled imaging device to light at the wavelength $\lambda$. In equation (1), the simulation represents a sampling of spectral responses for each of the k color channels of an imaging device across a wavelength range of $\lambda$. It is understood that any of a variety of wavelength sampling ranges may be used.

Often the spectral sensitivity $S_k$ of a kth color channel of an imaging device is not known, whereupon the simulation described above may not be satisfactorily performed. One alternative is to evaluate the spectral sensitivity $S_k$ by multiple captures of a calibrated color checker target. However, dependent on the sensor, this is a challenging task due to noise, non-linearities, clipping, and ADC color channel offsets. It is understood that such image degradations are to be minimized before such characterization. Furthermore, a sensor might be sensitive to wavelengths outside a sampled range. In such case, it may be more satisfactory to obtain image data generated from actual, rather than simulated, captures 203, 205, . . . 207.

For a given capture of an image under a reference illumination, an illumination color estimation such as a gray-world calculation may be determined for all of the image values in $R_{i,j,k}$. In an embodiment, the image values (r vectors) associated with a given capture may be averaged together per channel (e.g. assuming the model of a gray-world), at 240, resulting in an estimated illumination color $c=(c_k)_{k=1,\ldots,3}=(c_1, c_2,$ $c_3$) of the capture. In an embodiment, the estimated illumination color vector c of an image may be determined based on a modified gray-world estimation—e.g. wherein sufficiently monochromatic regions of the image are excluded from the determination of illumination color c of a reference image. For example, if the variance of the hues of all pixels in a region of an image exceeds a threshold, then that region of the image is regarded as sufficiently chromatic, and each vector r in that image region is to be included in the determining of an illumination color c of a reference image.

Additionally or alternatively, the inclusion of a particular image value r in determining an estimated illumination color c of an image may depend on whether the region of the image associated with the particular image value r has a sufficiently low luma Y. For example, the exclusion of high luma regions (e.g. Y>230 for 8-bit luma) from the illumination color estimation may prevent overexposed pixels affecting the gray-world result.

To become independent to image brightness, each element $c_k$ for k=1, 2, 3 of c may be normalized to an illumination color vector $\hat{c}=(\hat{c}_k)_{k=1,\ldots,3}=(\hat{c}_1, \hat{c}_2, \hat{c}_3)$, where:

$$\hat{c}_k = \frac{c_k}{c_1 + c_2 + c_3} \quad (2)$$

In an embodiment, a respective normalized illumination color vector $\hat{c}=(\hat{c}_k)_{k=1,\ldots,3}=(\hat{c}_1, \hat{c}_2, \hat{c}_3)$ may be determined, at 240, for each of captures 203, 205, . . . , 207—e.g. each $\hat{c}_k$ based on image values r associated with each respective capture as described above. Having determined a respective normalized illumination color $\hat{c}=(\hat{c}_k)_{k=1,\ldots,3}=(\hat{c}_1, \hat{c}_2, \hat{c}_3)$ for each capture of reference targets $Tref_1$ 202, $Tref_2$, 204, . . . $Tref_1$ 206 at illumination 210, a transformation of the set of illumination color information may be performed, at 250.

In an embodiment, a transformation of an illumination color may include a reduction in the dimensionality of the set of normalized illumination colors, e.g. by projecting the set of illumination colors into a 2-D chromaticity space. As discussed herein, the particular transformation may be determined at least in part by the illumination colors themselves. For example, transformation of a set of illumination colors may include performing a principal component analysis (PCA) for the set of estimated illumination colors associated with a reference illumination. In an embodiment, PCA may be performed in order to maximize the discrepancy between all illumination white-points, e.g. including illumination white-points associated with different reference illuminations. A probability distribution may then be determined, at 260, for the set of white point information which is obtained by transformation of the normalized illumination color information.

The particular transformation performed on the set of illumination colors may determine another transformation to be applied to non-reference image data for analysis and/or processing thereof. Such non-reference image data may represent a capture (e.g. capture 116) by an imaging device of an image of a target under a target illumination. In an embodiment, an illumination color for the non-reference image data may be determined, an indication of which may be provided as illumination color information 270. Based on illumination color information 270 a white point for image data may be determined according to techniques similar to those discussed herein with respect to determining a reference white point. In an embodiment, a description of a transformation to be applied to illumination color information 270 may be provided, at 255. Alternatively or in addition, one or more parameters describing the determined probability distribution of the transformed set of illumination color information may be provided, at 265. A transform applied to illumination color data of the reference images may then be applied to the illumination color vector of the non-reference image to generate a non-reference white point, whereupon a determination may be made, at 280, of a probability that the target illumination is the reference illumination 210.

Figure 3:
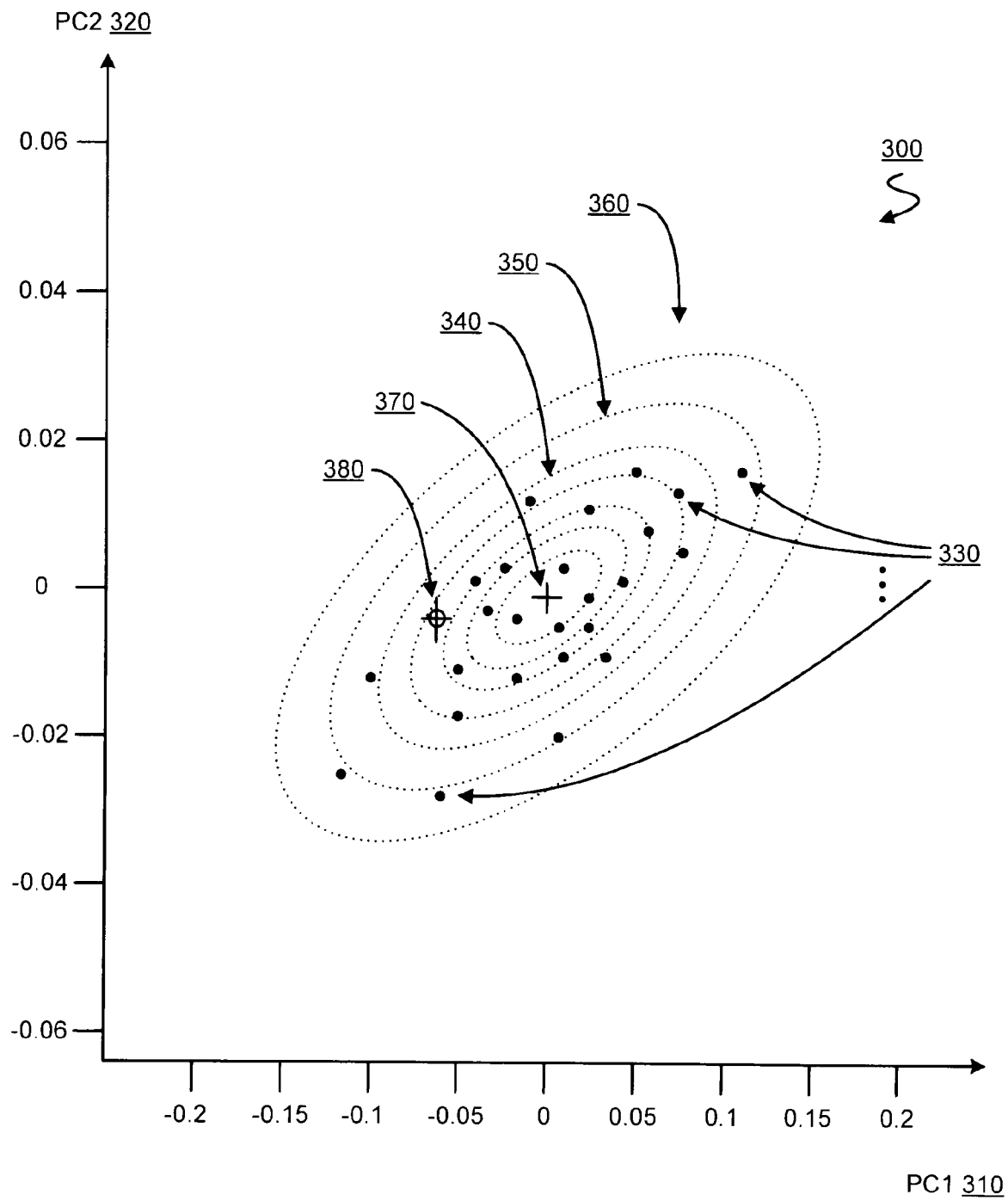
FIG. 3 is a graph illustrating illumination probability distribution information generated according to an embodiment.

FIG. 3 illustrates a graph 300 representing illumination probability distribution information generated according to an embodiment. For example, graph 300 may represent information in probability distribution data 155. Graph 300 includes a first principal component axis PC 310 and a second principal component axis PC2 320. In an embodiment, the PC1-PC2 plane may represent a plane in a chromaticity space onto which 3D illumination colors are projected. The first principal component axis 310 and the second principal component axis 320 may depend on the type of transformation performed, although principal component analysis is beneficial for discrepancy maximization. A set of data points 330 of graph 300 may, for example, represent set of reference white point information, such as the one discussed with reference to FIG. 2, which has a dimensionality that has been decomposed by PCA projection to the PC1-PC2 plane of graph 300. As discussed herein, points on the PC1-PC2 plane of graph 300 may each be associated with probability values—which may be visualized as a third height axis (not shown)—to describe respective associations of these points on the PC1-PC2 plane with a particular illumination.

Each of the data points 330 may represent a white point of a capture of an image of a respective reference target. In an embodiment, the images of the respective reference targets are each captured under a common reference illumination represented by the set of data points 330. The corresponding illumination colors of data points 330 may be normalized prior to their projection into the PC1-PC2 plane of graph 300 by PCA, e.g. according to equation 2.

A distribution 360, represented in part by contour lines 340, 350, can be generated based on a statistical analysis of the values of data points 330. Distribution 360 may represent a likelihood of association of points in graph 300 with the reference illumination represented by the set of data points 330. For example, a point 370 on the PC1-PC2 plane may represent the strongest association with the reference illumination represented by the set of data points 330, while contour lines—e.g. 340, 350—demark successive regions of decreased association with the reference illumination.

In an embodiment, the distribution 360 may be used to determine a probability that a particular illumination is the reference illumination represented by the set of data points 330. By way of non-limiting example, an illumination color calculated from non-reference image data may be normalized and transformed to generate a non-reference white point 380 on the PC1-PC2 plane of graph 300. The non-reference image data may represent a capture by an imaging device of a target image under a target illumination. In an embodiment, white point 380 may be generated from a transformation of the non-reference data which is based on the particular transformation used to generate the set of data points 330. The location of white point 380 on the PC1-PC2 plane and data describing the distribution 360 may be used to calculate a probability that the target illumination is the reference illumination represented by the set of data points 330.

Figure 4:
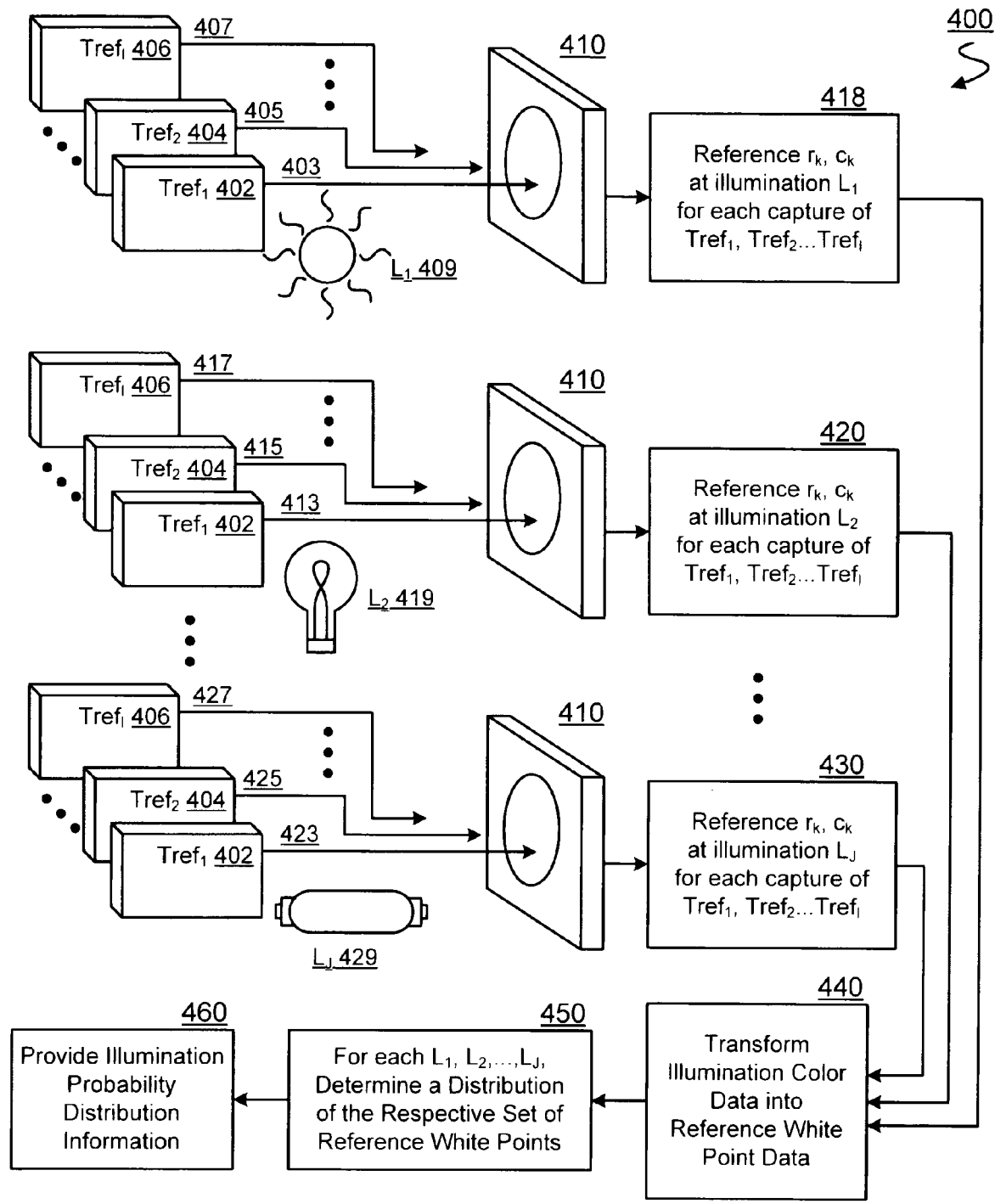
FIG. 4 is a flow diagram illustrating select elements of a process for providing illumination probability distribution information according to an embodiment.

FIG. 4 illustrates select elements of a process 400 for generating reference data according to an embodiment. In an embodiment, the process 400 generates data such as illumination probability distribution data 155. By way of non-limiting example, the generation of illumination probability distribution data according to process 400 may be accomplished by any of a variety of hardware and/or software means for data processing (e.g., ASIC, FPGA, EPROM, and/or an execution of stored instructions) which may reside in a probability distribution source such as probability distribution source 150 and/or in an apparatus such as apparatus 180.

Process 400 may include generating a reference white point data set including component sets of reference white point data, each component set of reference white point data associated with a respective reference illumination. By way of non-limiting example, process 400 may generate component sets of reference white point data for each of illumination $L_1$ 409, illumination $L_2$ 419, . . . , illumination $L_1$ 429. Illuminations $L_1$ 409, $L_2$ 419 and $L_1$ 429 may, for example, correspond respectively to the CIE-defined illuminant D65, illuminant A and illuminant F2. In various embodiments, any of a variety of other illuminations may used in addition to or as an alternative to any or all of the exemplary illuminations of FIG. 4.

For each illumination in any plurality of illuminations, e.g. illuminations $L_1$ 409, $L_2$ 419, . . . , $L_1$ 429, an associated set of image data may be obtained representing a set of captures by an imaging device, wherein each capture is of an image of a reference target under a respective associated reference illumination. By way of non-limiting example, a set of image data associated with a known reference illumination $L_1$ 409 may be obtained at 418. The set of image data may, for example, include one or more of an image value r describing respective spectral responses of an imaging device 410 for respective regions of a capture. More particularly, each of captures 403, 405, . . . , 407 may capture an image of a respective one of reference targets $Tref_1$ 402, $Tref_2$, 404, . . . $Tref_1$ 406 under illumination $L_1$ 409. In an embodiment, one or more of an image value r for capture 403 may be used to determine a respective illumination color $c=(c_1, c_2, c_3)$ for the capture of reference target $Tref_1$ 402 under reference illumination $L_1$ 409. Similarly, illumination colors may be determined for each of remaining captures 405, . . . , 407. The set of all illumination colors determined for captures 403, 405, . . . , 407 represents a component set of illumination color data associated with reference illumination $L_1$ 409.

Additionally or alternatively, further image data may similarly be obtained at 420 to generate a component set of reference white point data associated with illumination $L_2$ 419. For example, a set of image data associated with a known reference illumination $L_2$ 419 may be obtained, including one or more of an image value r describing spectral responses of an imaging device 410 for respective regions of a capture. More particularly, each of captures 413, 415, . . . , 417 may capture an image of a respective one of reference targets $Tref_1$ 402, $Tref_2$, 404, . . . $Tref_1$ 406 under illumination $L_2$ 419. In an embodiment, one or more image value r for capture 413 may be used to determine a respective illumination color $c=(c_1, c_2, c_3)$ for the capture of reference target $Tref_1$ 402 under reference illumination $L_2$ 419. Similarly, illumination colors may be determined for each of remaining reference captures 415, . . . , 417. The set of all illumination colors determined for captures 413, 415, . . . , 417 represents a component set of illumination color data associated with reference illumination $L_2$ 419.

Additionally or alternatively, further image data may similarly be obtained at 430 to generate a component set of illumination color data associated with illumination $L_J$ 429. For example, a set of image data associated with a known reference illumination $L_J$ 429 may be obtained, including one or more of an image value r describing respective spectral responses of an imaging device 410 for respective regions of a capture. More particularly, each of captures 423, 425, . . . , 427 may capture an image of a respective one of reference targets $Tref_1$ 402, $Tref_2$, 404, . . . $Tref_1$ 406 under illumination $L_J$ 429. In an embodiment, one or more of an image value r for capture 423 may be used to determine a respective illumination color $c=(c_1, c_2, c_3)$ for the capture of reference target $Tref_1$ 402 under reference illumination $L_J$ 429. Similarly, illumination colors may be determined for each of remaining reference captures 425, . . . , 427. The set of all illumination colors determined for captures 423, 425, . . . , 427 represents a component set of illumination color data associated with reference illumination $L_J$ 429.

In an embodiment, the obtaining of illumination color data c at one or more of 418, 420, 430 may be according to various techniques described herein with respect to the process 200 of FIG. 2. For example, although image data may be obtained from actual captures of reference targets $Tref_1$ 402, $Tref_2$, 404, . . . $Tref_1$ 406 by imaging device 410, in alternative embodiments, such image data may be obtained based on data which models such captures based on known spectral characteristics of imaging device 410. Similarly, the determining and/or normalizing of illumination colors—e.g. based on gray world assumptions—may be according to one or more of the techniques discussed herein with respect to FIG. 2.

The component sets of illumination color data obtained at 418, 420 and 430 may, at 440, result in a set of illumination color data for multiple reference illuminations to be transformed, for example, by PCA. In an embodiment, the transformation of the combined set of illumination colors into reference white point data may be according to processes described herein with respect to the process 200 of FIG. 2.

Particular details of generating a set of reference white point data according to an exemplary embodiment are described. Let I be a number of reference targets and J a number of reference illuminations. Let $w_k$ be a column vector with I·J elements hosting each component $\hat{c}_k$ for the color channel k of every normalized illumination color vector $\hat{c}$. Let $\overline{w}_k$ be the mean value of all elements of $w_k$ and $m=(\overline{w}_1, \overline{w}_2, \overline{w}_3)^T$. The matrix $W=(w_1-\overline{w}_1, w_2-\overline{w}_2, w_3-\overline{w}_3)$ has the singular value decomposition $W=USV^T$, where U and V are two orthogonal matrices, S is a diagonal matrix holding the singular values of W in a decreasing order from left top to right bottom, and the columns of matrix V are the eigenvectors of $$\frac{1}{IJ} W^T W,$$

which is the autocovariance matrix of W. In an embodiment, a matrix $\hat{V}$—e.g. comprising the first two columns of V—may be used to transform all normalized illumination colors into a principal component plane by $Q_{PCA}=W \hat{V}$. Choosing the eigenvectors in matrix V which correspond to the two biggest singular values of S results in a projection into a 2D chromaticity space which increases discrepancies between the transformed data of the target samples.

The matrix $Q_{PCA}$ resulting from the transformation at 440 may include elements representing respective transformed reference white points. More particularly, each of the transformed reference white points of matrix $Q_{PCA}$ may be associated with a respective one of illuminations $L_1, L_2, \ldots, L_J$—e.g. by virtue of the respective illumination of a capture corresponding to each transformed reference white points. At 450, a distribution may be determined for a set of the transformed reference white points of matrix $Q_{PCA}$ which are associated with the same one of illuminations $L_1, L_2, \ldots, L_J$. In an embodiment, for a set of multispectral images captured under one illumination, the white points—e.g. the normalized and PCA transformed illumination colors—may be considered to be normally distributed. However, it is understood that any of a variety of alternative distribution types may be assumed in order to determine a distribution associated with a reference illumination. In an exemplary case of a Gaussian assumption, a multivariate Gaussian distribution may be defined as:

$$f(x, \mu, \Sigma) = \frac{1}{2\pi\sqrt{\det(\Sigma)}} \exp\left(-\frac{1}{2}(x-\mu)\Sigma^{-1}(x-\mu)^T\right) \quad (3)$$

with mean $\mu$, and covariance matrix $\Sigma$ (a positive definite real-valued quadratic matrix).

Based on the values of the transformed reference white points of matrix $Q_{PCA}$ which are associated with the same illumination j of illuminations $L_1, L_2, \ldots, L_J$, a mean vector $\mu_j$ and a covariance matrix $\Sigma_j$ may be computed. By determining, at 450, a respective mean vector $\mu$ and covariance matrix $\Sigma$ for each of illuminations $L_1, L_2, \ldots, L_J$, a Gaussian Mixture Model may be fitted to the principal component data $Q_{PCA}$. Based on the one or more distributions determined at 450, information may be provided, at 460, indicating probability distributions associated with one or more of illuminations $L_1, L_2, \ldots, L_J$.

Figure 5:
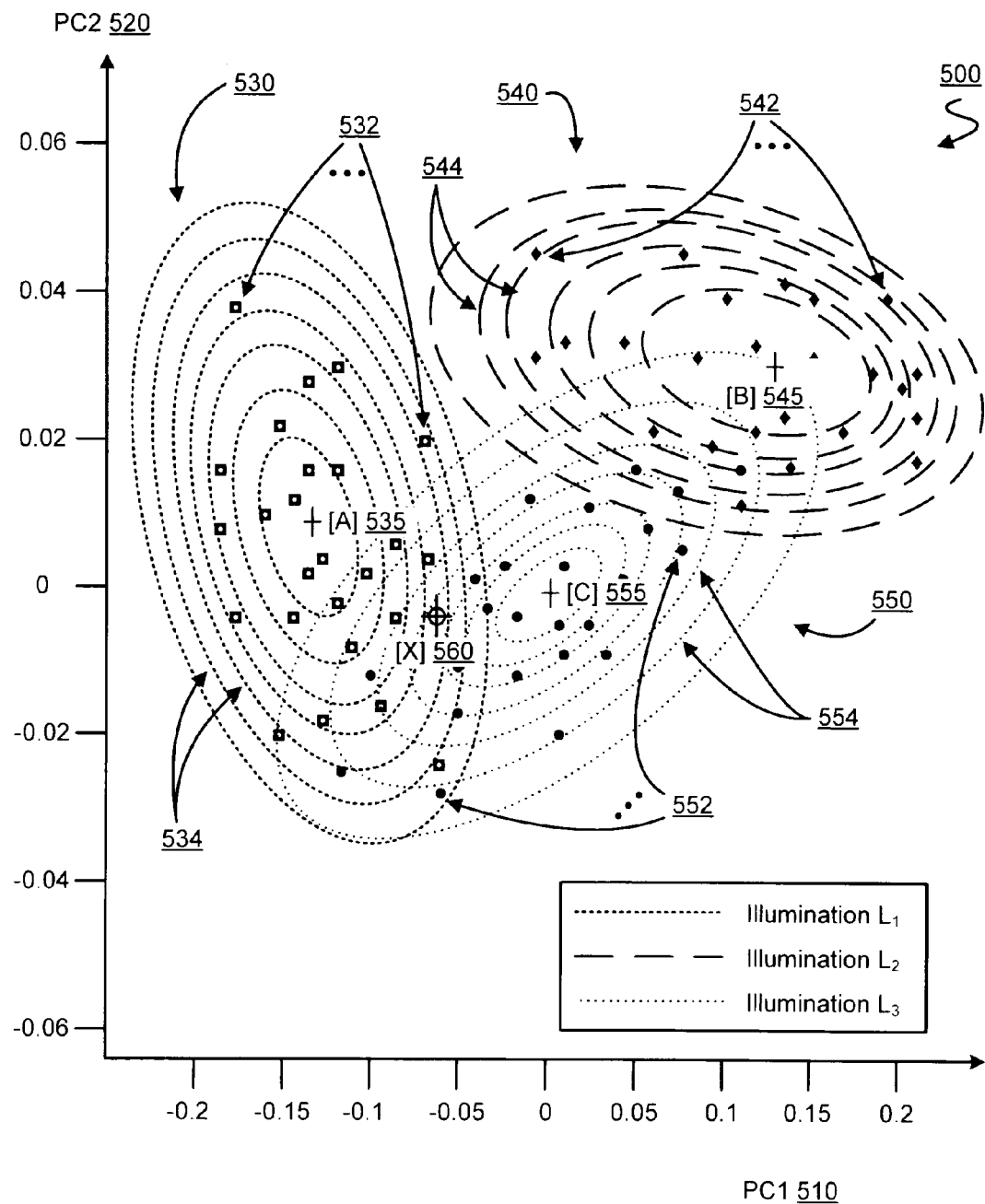
FIG. 5 is a graph illustrating illumination probability distribution information generated according to an embodiment.

FIG. 5 illustrates a graph 500 representing illumination probability distribution information generated according to an embodiment. Parts of graph 500 may correspond to parts of graph 300, for example. In an embodiment, graph 500 may represent information in probability distribution data 155. Graph 500 includes a first principal component axis PC1 510 and a second principal component axis PC2 520. Graph 500 may include sets of data points 532, 542, 552, each set associated with a respective reference illumination. In an embodiment, each set of data points 532, 542, 552 may be associated with respective reference illuminations $L_1$, $L_2$, and $L_3$. Reference illuminations $L_1$, $L_2$, and $L_3$ of FIG. 5 may, for example, represent the illuminations $L_1, L_2$, and $L_J$ of FIG. 4.

By way of non-limiting example, the set of data points 532 may be a set of reference white points such as one of those discussed with reference to FIG. 4—e.g. illumination colors projected by PCA to the PC1-PC2 plane of graph 500. Illumination colors corresponding to sets of data points 532, 542, 552 may be normalized prior to their projection into the PC1-PC2 plane of graph 500. Each data point in the set of the data points 532 may be a white point of a capture of an image of a respective reference target. In an embodiment, the images of the respective reference targets are each captured under a common reference illumination represented by the set of data points 532.

A distribution 530, indicated graphically by contour lines 534, may be determined based on a statistical analysis of the values of data points 532. Distribution 530 may represent various respective degrees of association of points in graph 500 with the illumination represented by the set of data points 532. For example, a point [A] 535 on the PC1-PC2 plane may have the strongest association with the reference illumination represented by the set of data points 532, while contour lines 534 demark successive regions of decreased association to the reference illumination.

Alternatively or in addition, a distribution 540, indicated graphically by contour lines 544, may be determined based on a statistical analysis of the values of data points 542. Distribution 540 may represent various respective degrees of association of points in graph 500 with the illumination represented by the set of data points 542. For example, a point [B] 545 on the PC1-PC2 plane may have the strongest association with the reference illumination represented by the set of data points 542, while contour lines 544 demark successive regions of decreased association to the reference illumination.

Alternatively or in addition, a distribution 550, indicated graphically by contour lines 554, may be determined based on a statistical analysis of the values of data points 552. Distribution 550 may represent various respective degrees of association of points in graph 500 with the illumination represented by the set of data points 552. For example, a point [B] 555 on the PC1-PC2 plane may have the strongest association with the reference illumination represented by the set of data points 552, while contour lines 554 demark successive regions of decreased association to the reference illumination.

In an embodiment, one or more of distributions 530, 540, 550 may be used to determine one or more respective probabilities that a particular illumination is a reference illumination represented by a respective one of the sets of data points 532, 542, 552. By way of non-limiting example, an illumination color calculated from non-reference image data may be normalized and transformed to generate a non-reference white point [X] 560 on the PC1-PC2 plane of graph 500. The non-reference image data may represent a capture by an imaging device of a target image under a target illumination, wherein information describing one or more conditions of said capture is to be calculated based on reference information such as the sets of white points 532, 542, 552. In an embodiment, generation of non-reference white point [X] 560 may include operations performed, for example, by one or more of illumination color determining means 140, probability distribution data source 150 and probability determining means 160.

By way of non-limiting example, the white point calculated from said non-reference image data may be calculated according to various respective techniques described herein with respect to FIGS. 2 and 4. In an embodiment, the non-reference image data may be used to calculate a normalized illumination color $\hat{c}=(\hat{c}_1, \hat{c}_2, \hat{c}_3)$. Furthermore, as illustrated by reference number 255 of process 200, a description of the transformation to be applied to the non-reference illumination color $\hat{c}=(\hat{c}_1, \hat{c}_2, \hat{c}_3)$ may be provided, for example, from probability distribution data source 150 to probability determining means 160. For example, a description of transformation 440 of reference illumination color data can be provided to describe a similar transformation to be applied to non-reference illumination color data. In an embodiment, the particular transformation performed to generate sets of data points 532, 542, 552 may determine a transformation to be performed on the illumination color calculated from said non-reference image data. For example, data may be provided which describes a matrix $\hat{V}$ and mean m, previously used to generate the principal component data $Q_{PCA}$ having elements representing all reference white points for all reference illuminations. A white point $c^{PCA}$ may then be calculated by a transform such as $c^{PCA}=\hat{V}^T(\hat{c}-m)$, where $c^{PCA}$ may be represented by the point [X] 560 on the PC1-PC2 plane of graph 500.

Given the location of data point [X] 560 on the PC1-PC2 plane, distributions 530, 540, 550 may be used to calculate the respective probabilities that the target illumination is an illumination 1, that the target illumination is an illumination 2 and that the target illumination is an illumination J. Any number of various illuminations may be used in addition to or as an alternative to some or all of the illuminations of FIG. 5. As illustrated by reference number 265 of process 200, one or more parameters of one or more such distributions may be provided, for example, from probability distribution data source 150 to probability determining means 160. By way of non-limiting example, a respective mean vector $\mu_j$ and covariance matrix $\Sigma_j$ calculated for each one j of J reference illuminations may be provided. In an embodiment, the likelihood of $c^{PCA}$, when given illumination j, is defined by:

$$p(c^{PCA}|j) = f(c^{PCA}, \mu_j, \Sigma_j). \quad (4)$$

Where $f(.)$ is the Gaussian distribution function used to determine the one or more reference illumination probability distributions. In an embodiment, a Bayes classifier may be used to find a most probable illumination $j^{MAP}$ in terms of a maximum a posteriori (MAP) criteria:

$$p(j|c^{PCA}) = \frac{p(c^{PCA}|j)p(j)}{\sum_{\hat{j}=1}^{J} p(c^{PCA}|\hat{j})p(\hat{j})} \quad (5)$$

$$j^{MAP} = \arg\max_j p(j|c^{PCA})$$

If no information about the occurrence of certain illuminations is available, then a-priori likelihoods p(j) in eq. (5) are constant and argmax $p(j|c^{PCA})$ yields to the maximum likelihood (ML) classification. If an a-priori likelihood is available—e.g. $p(j)=p(j|\text{exposure})$—the p(j) are not constant anymore and (5) is a MAP classifier.

Color correction of non-reference image data may be implemented based on a most likely reference illumination. e.g. $j^{MAP}$. In an exemplary embodiment, $A_j$, $d_j$ and $o_j$ are, respectively, a color correction matrix, a set of white-balance coefficients and a set of offsets to implement color correction for a reference illumination j. More particularly, a corrected image value r' may be determined according to $r'=A_j \text{diag}(d_j) r+o_j$, where diag(.) denotes a diagonal matrix with the elements of $d_j$ on its diagonal. In an embodiment, $A_j$, $d_j$ and $o_j$ may be determined using linear regression on a calibrated color checker target beforehand according to any of a variety of methods well known in the art. By way of illustration and not limitation, the determining of such color correction parameters may be according to any of a variety of techniques set forth, for example, in Jianping Zhou, *Gray-preserving color correction without exposure value information*, Proceedings of the SPIE (Color Imaging XIII), Volume 6807, January 2008, in Graham D. Finlayson and Mark S. Drew, *Constrained least-squares regression in color spaces*, Journal of Electronic Imaging, vol. 6, pages 484-493, October 1997, and/or in Simone Bianco, Francesca Gasparini, Alessandro Russo, Raimondo Schettini, *A New Method for RGB to XYZ Transformation Based on Pattern Search Optimization*, IEEE Transactions on Consumer Electronics, vol. 53, Issue 3, pages 1020-1028, August 2007.

In various embodiments, image processing such as color correction may be based on multiple reference illuminations—e.g. in addition to a most likely reference illumination such as $j^{MAP}$. Moreover, a smooth transition of the color profile from one image to another image may be desirable. To determine color correction based on multiple reference illuminations, a mixture model of the reference illumination probability distributions may be applied to color correction parameters. Additionally or alternatively, to achieve smoothing of color profile transitions from one image to another, determining of color correction parameters for one image may take into account color correction parameters applied to another image.

For a given transformed white point $c^{PCA}$ of a non-reference capture, all a posteriori likelihoods $p(j|c^{PCA})$ for the j reference illuminations may be evaluated, e.g. by eq. (5). Then the new interpolated color correction matrix $A_{int}$, white-balance coefficient $d_{int}$ and offset $o_{int}$ may be determined, e.g. by:

$$A_{int} = \sum_{j=1}^{J} p(j|c^{PCA}) A_j, \quad (6)$$

$$d_{int} = \sum_{j=1}^{J} p(j|c^{PCA}) d_j$$

$$o_{int} = \sum_{j=1}^{J} p(j|c^{PCA}) o_j$$

In various embodiments, selecting and/or weighting of a probability distribution for a particular reference illumination in estimating a non-reference target illumination may be based on other information provided by an imaging device. For example, in fluorescent illumination conditions, spatial image flicker may occur with an exposure technique of an imaging device called electronic rolling shutter. An electronic rolling shutter only exposes one portion of the image frame at a time, while this portion continually "rolls" through the image from top to bottom. By way of illustration and not limitation, a rolling shutter exposure may be implemented according to techniques set forth, for example, in A. I. Krymski, and K.-B. Cho, Look Ahead Rolling Shutter System in CMOS Sensor, United States Patent Application Publication, US 2005/0057674 A1, March 2005. When an imaging device indicates an occurrence image flicker, it is very likely that the imaging device is capturing an image under a fluorescent illumination environment. Accordingly, various embodiments of the invention, in addition to processing images according to techniques described herein, may estimate a non-reference illumination by additionally selecting or otherwise giving more weight to a fluorescent reference illumination in response to an indication of image flicker.

In various embodiments, interpolation of the color correction to be applied to a non-reference image may be refined to further account for a particularly strong probability of the non-reference illumination being a given reference illumination. For example, it may be desirable to either choose a single reference color correction or choose a linear combination of multiple color corrections depending on whether or not a non-reference white point is in a region sufficiently far from the centers of the reference illumination probability distributions. By way of non-limiting example, a color profile may be smoothly switched between MAP classification and interpolation by determining a new color correction matrix $A_{new}$ from the $A_{jMAP}$ of MAP reference illumination $j^{MAP}$ and the interpolated $A_{int}$, e.g. as follows:

$$A_{new} = zA_{jMAP} + (1-z)A_{int} \quad (7)$$

$$= ((1-z)p(j|c^{PCA}) + z)A_{jMAP} + (1-z)$$

-continued $$\sum_{\substack{j=1 \\ j \neq j^{MAP}}}^{J} p(j \mid c^{PCA}) A_j$$

where $$z = h_{jMAP}\left(\frac{p(c^{PCA} \mid j^{MAP})}{p(\mu_{jMAP} \mid j^{MAP})}\right)$$

and the function $h_j$ is defined by:

$$h_j(\alpha) = \min\left(1, \max\left(0, \frac{\alpha - \tau_{j,1}}{\tau_{j,2} - \tau_{j,1}}\right)\right) = \begin{cases} 1, & \alpha \geq \tau_{j,2} \\ \frac{\alpha - \tau_{j,1}}{\tau_{j,2} - \tau_{j,1}}, & \tau_{j,1} < \alpha < \tau_{j,2} \\ 0, & \alpha \leq \tau_{j,1}, \end{cases} \quad (8)$$

Where $\tau_{j,1} < \tau_{j,2}$ are two thresholds, that define at which probability the single illumination color correction is preferred rather than an interpolated color correction based on multiple illuminations. Similarly, $d_{new}$ and $o_{new}$ may be evaluated analogously as $d_{new} = z \, d_{jMAP} + (1-z) d_{int}$ and $o_{new} = z \, o_{jMAP} + (1-z) o_{int}$.

Accounting for imaging device exposure settings may provide an additional or alternative refinement to image processing which is based on only a reference illumination which is the most likely reference illumination $j^{MAP}$. According to an embodiment, a probability distribution $p(j|exposure)$ may be determined for each reference illumination $j$, whereby equation (5) may be adapted to:

$$p(j \mid c^{PCA}) = \frac{p(c^{PCA} \mid j) p(j \mid exposure)}{\sum_{\hat{j}=1}^{J} p(c^{PCA} \mid \hat{j}) p(\hat{j} \mid exposure)} \quad (9)$$

In an embodiment, the J reference illuminations may be separated into a set $\Omega_{in}$ of all reference illuminations which are inside lights (e.g. incandescent or fluorescent) and into a set $\Omega_{out}$ of all illuminations which are outside daylights. Respective probabilities $p(exposure|j)$ across a range of exposures may be approximated for each of $\Omega_{out}$ and $\Omega_{in}$—e.g. assuming a normal distribution across the range of exposures. In an embodiment, each $p(exposure|j)$ may be approximated based on a profile of output signal gain characteristics of an imaging device. Assuming an exposure time T and analog gain g are linear with regard to image luminance, an overall exposure gain for a given imaging device may be determined by $g_{exp} = kTg$, where k is a factor to calibrate a given imaging device based on known imaging statistics of a reference imaging device.

In an embodiment, two sets of reference image captures may be taken, one set under one or more indoor (e.g. incandescent or fluorescent) reference illuminations, and one set under one or more outdoor reference illuminations. For each set of reference image captures, a respective set of proper exposure times may be determined. A mean $\mu_{in}^*$ and variance $\sigma_{in}^2$ of the exposure times for the inside image captures may be determined, as may a mean $\mu_{out}^*$ and variance $\sigma_{out}^2$ of the exposure times for the set of outside image captures. Based on the statistical parameters of the indoor and outdoor exposure time distributions, an exposure probability may be determined for each of the respective j reference illuminations, so that:

$$p(exposure \mid j \in \Omega_{in}) = \quad (10)$$

$$p(\log(g_{exp}) \mid j \in \Omega_{in}) = \frac{1}{\sigma_{in}\sqrt{2\pi}} \exp\left(-\frac{(\log(g_{exp}) - \mu_{in}^*)^2}{2\sigma_{in}^2}\right),$$

$$p(exposure \mid j \in \Omega_{out}) =$$

$$p(\log(g_{exp}) \mid j \in \Omega_{out}) = \frac{1}{\sigma_{out}\sqrt{2\pi}} \exp\left(-\frac{(\log(g_{exp}) - \mu_{out}^*)^2}{2\sigma_{out}^2}\right)$$

Absent any information about a statistical occurrence of a certain illumination type, it may be assumed that $p(j \in \Omega_{in}) = p(j \in \Omega_{out})$, resulting in:

$$p(j \in \Omega_{in} \mid exposure) = \frac{p(exposure \mid j \in \Omega_{in}) p(j \in \Omega_{in})}{p(exposure \mid j \in \Omega_{in}) p(j \in \Omega_{in}) +} \quad (11)$$
$$\phantom{p(j \in \Omega_{in} \mid exposure) = } p(exposure \mid j \in \Omega_{out}) p(j \in \Omega_{out})$$

$$= \frac{p(exposure \mid j \in \Omega_{in})}{p(exposure \mid j \in \Omega_{in}) +}$$
$$\phantom{=} p(exposure \mid j \in \Omega_{out})$$

Similarly, $p(j \in \Omega_{out}|exposure)$ may be determined in a manner analogous to equation (11).

Figure 8:
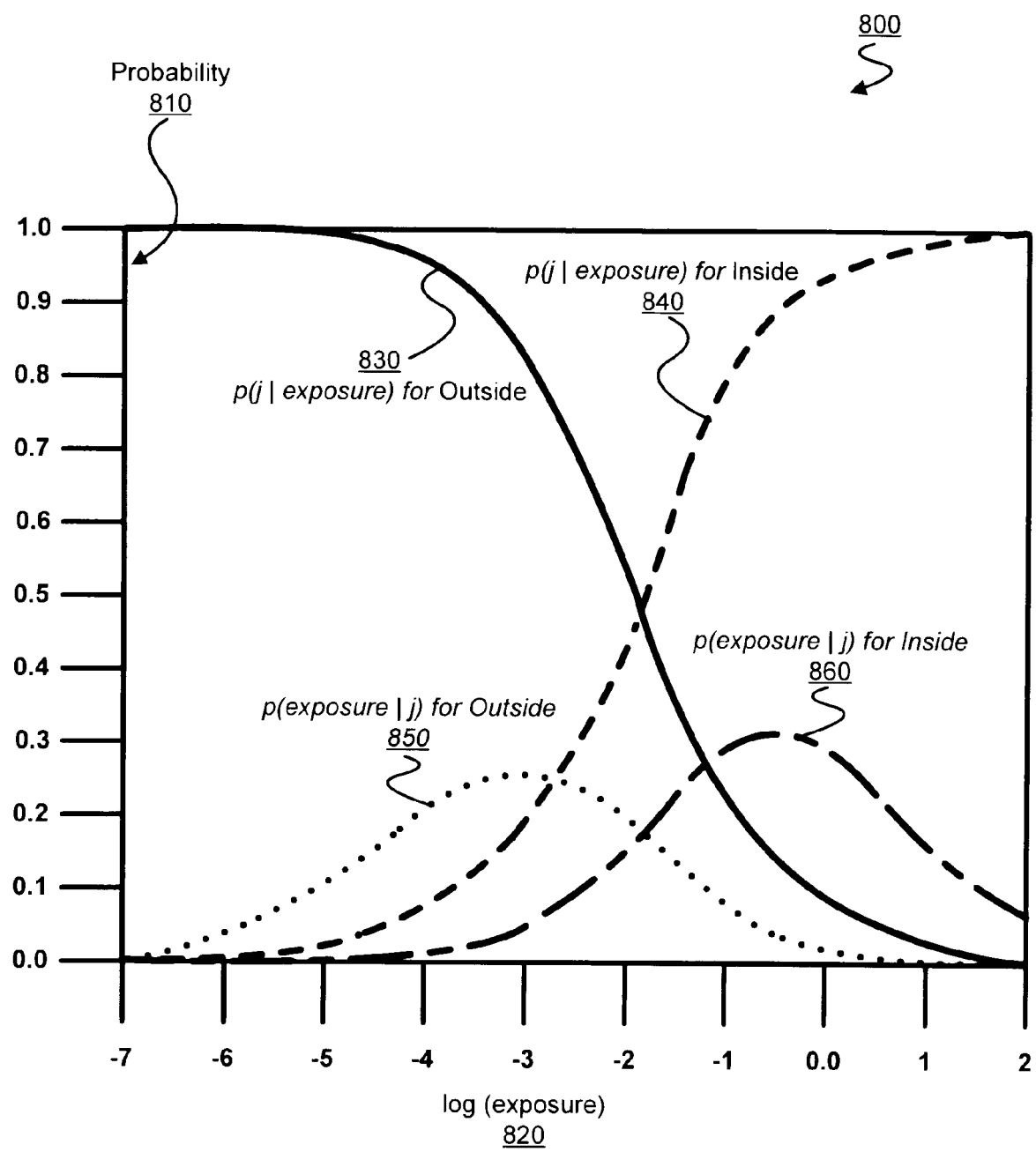
FIG. 8 is a graph illustrating probability distributions for determining, according to an embodiment, an illumination probability based on imaging device exposure information.

FIG. 8 is a graph 800 illustrating, for a logarithmic range 820 of exposure values of an imaging device, probability values of axis 810 similar to those which may be determined according to the above described techniques. Curves 850 and 860 represent, respectively, $p(exposure|j)$ for an outside illumination, and $p(exposure|j)$ for an inside illumination. Curves 830 and 840 represent, respectively, $p(j|exposure)$ for outside illuminations $\Omega_{out}$, $p(j|exposure)$ for inside illuminations $\Omega_{in}$. In an embodiment, the particular choice of a $p(j|exposure)$ for a set $\Omega_{in}$ or a $p(j|exposure)$ for a set $\Omega_{out}$ in performing the calculation of equation (9) depends on the particular set $\Omega_{in}$, $\Omega_{out}$ to which reference illumination $j$ is considered to belong.

Image processing based on probabilistic exposure information such as $p(j|exposure)$ may be further refined to take into account a change of target illuminations in a sequence of target image captures. In various embodiments, such refinements slow down a rate of change of color adaptation to model how human vision adapts to new illumination. For example, white-balance fluctuations in a sequence of non-reference images may be dampened by averaging a number of respective chrominances $c^{PCA}$ of the most recent non-reference captures. In an exemplary embodiment, a filter size e=1 may be initialized—e.g. in a color correction means of apparatus 180 (not shown)—to keep track of the number of the most recent $c^{PCA}$ chrominances to average. The filter may be constrained to a minimum filter size $e_{min}$ and/or maximum filter size $e_{max}$. A history $h_c$ of all incoming non-reference $c^{PCA}$ values for the most recent e non-reference image captures may be stored. Similarly, a history $h_p$ may be stored of illumination probabilities—e.g. $p(j \in \Omega_{in}|xposure)$—for each of the most recent e non-reference image captures.

For a given incoming non-reference capture, a current absolute distance from $p(j \in \Omega_{in}|exposure)$ to the average of all $h_p$ may be computed. If this distance exceeds a threshold $\Delta p$ (e.g. 0.2), then the current filter size e may be decreased by a constant $\Delta e_-$ (e.g. 3), else the current filter size e may be increased by a constant $\Delta e_+$ (e.g. 1). The $p(j \in \Omega_{in}|\text{exposure})$ of the incoming non-reference capture may be appended to the history $h_p$, and the current $c^{PCA}$ appended to the history $h_c$. In order to limit the filter size in the case e exceeds $e_{max}$ or goes below $e_{min}$, or e has not yet reached the size of $|h_c|$ (where $|.|$ denotes the number of elements of $h_c$, in this case) after startup, a new filter size e* may be calculated as follows:

$$e^* := \min(|h_c|, \max(e_{min}, \min(e_{max}, e))) \quad (12)$$

According to the new filter size e*, the most recent chrominances $c^{PCA}$ in the history $h_c$ may be averaged to a $\bar{c}^{PCA}$, which may then be used to determine a probable target illumination according to the various techniques described herein.

Figure 6:
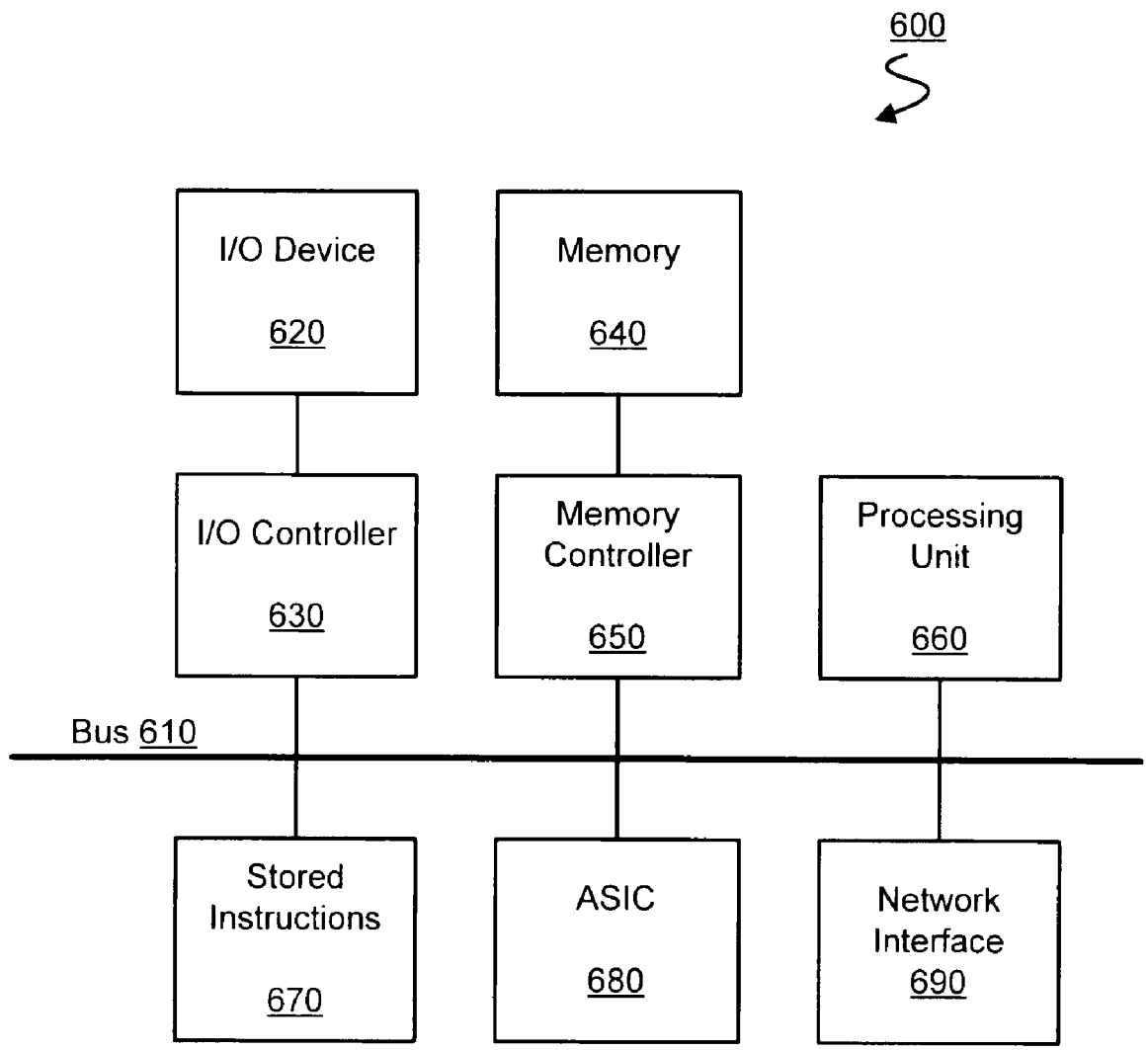
FIG. 6 is a block diagram illustrating select elements of an apparatus for determining illumination probability information according to an embodiment.

FIG. 6 illustrates select elements of a system 600 to implement embodiments of the invention. In an embodiment, one or more elements of system 600 may correspond to respective elements of system 100, for example. System 600 may include a bus 610 interconnecting one or more components. In various embodiments bus 610 may include one or more data, control and/or input/output (I/O) busses configured for data exchanges according to various embodiments described herein. System 600 may further include an I/O device 620 to exchange information to and/or from system 600, e.g. under the control of an I/O controller 630. In an embodiment, I/O device 620 may include an imaging device such as a digital camera, video recorder, etc. or a device to receive image data generated by such an imaging device.

System 600 may further include a processing unit 660 connected to bus 610 and a memory 640 to exchange data via bus 610, e.g. under the control of a memory controller 650. Processing unit 660 may include one or more data processors to perform image data calculations according to various embodiments. Memory 640 may include any of a variety of random access memory (RAM), cache, hard drive or other similar data storage devices to store, for example, image data received via I/O device 620 and/or image data calculations processed by processing unit 660. System 600 may further include stored executable instructions 670 which, for example, when executed by processing unit 660 may cause system 600 to perform methods according to various embodiments.

System 600 may also include hardware, illustrated in FIG. 6 as an exemplary ASIC 680, to implement various means of determining image data calculations. In various embodiments, the ASIC 680 may alternatively or additionally include a FPGA, EPROM or similar device, for example, to implement one or more of the functionalities of an illumination color determining means and/or a probability determining means. Processing unit 660 and ASIC 680 (or similar hardware device) may variously implement one or more of image data, illumination color and white point calculations for reference and/or non-reference image captures, e.g. as discussed herein with respect to FIG. 2 and FIG. 4. One or more of 680 and 660 may further include color correction means to implement color correction calculations according to techniques described herein. System 600 may further include a network interface 690 coupled to bus 610 to provide output information, e.g. an indication of a estimated probability calculated by processing unit 660 that an illumination of a non-reference capture is a reference illumination.

Figure 7:
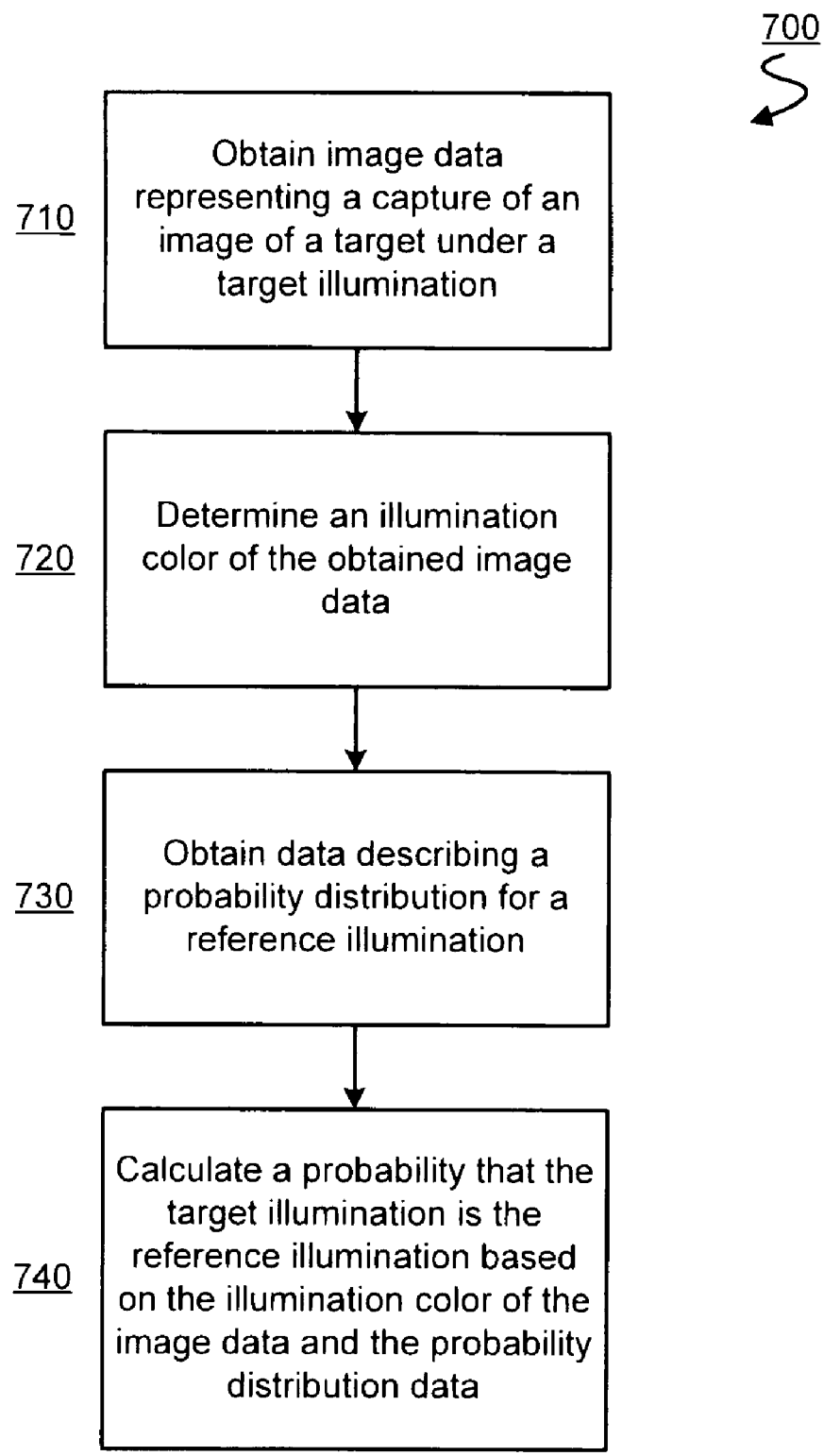
FIG. 7 is a flow diagram illustrating select elements of a process for determining illumination probability information according to an embodiment.

FIG. 7 includes select elements of a process 700 for determining illumination probability information according to an embodiment. Process 700 may be performed, for example, by an apparatus such as apparatus 180. In various embodiments, certain elements of process 700 may include techniques described with respect to corresponding elements of process 200 and/or process 400.

Process 700 may begin, at 710, by obtaining image data representing a capture of an image of a target under a target illumination. The image data may include one or more values for respective regions of a non-reference capture of an image of a target under a target illumination, e.g. capture 116. At 720, an illumination color of the obtained image data may be determined. In various embodiments determined illumination color may be based on a gray world assumption and normalized according to various techniques described herein.

At 730, data is obtained which describes a probability distribution for a reference illumination. The obtained probability distribution data may describe respective probability distributions of one or more additional reference illuminations. For example, the obtained probability distribution data may indicate a matrix $\hat{V}$ and mean m used to transform (e.g. via PCA) one or more sets of illumination colors associated with respective reference illuminations. Alternatively or in addition, the obtained probability distribution data may indicate a respective mean $\mu$ and covariance matrix $\Sigma$ for each distribution of a transformed set of white points associated with a respective reference illumination. Based on the determined illumination color and the obtained probability distribution data, a probability may be calculated, at 740, that a target illumination associated with the image data is the reference illumination.

Techniques and architectures for processing image data are described herein. In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by one or more instructions of a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
obtaining image data representing a capture by an imaging device of an image of a target under a target illumination, the image data including image pixel values corresponding to respective zones of the image of the target;
determining an illumination color of the image, including calculating an average of the image pixel values;
calculating with a processor a probability that the target illumination is a reference illumination based on the determined illumination color and data describing a previously calculated probability distribution for the reference illumination; and
storing in a memory device an indication of the calculated probability that the target illumination is the reference illumination.

2. The method of claim 1, further comprising:
obtaining data representing a set of captures by an imaging device, wherein each capture in the set of captures is of an image of a reference target in a set of reference targets, wherein each image is of a reference target under the reference illumination, the data representing the set of captures including a white-point for each capture in the set of captures; and
generating the data describing the previously calculated probability distribution for the reference illumination, including calculating a probability distribution of the white-points for each capture in the set of captures.

3. The method of claim 2, further comprising:
obtaining data representing a second set of captures by an imaging device, wherein each capture in the second set of captures is of an image of a reference target in the set of reference targets, wherein each image is of a reference target under a second reference illumination, the data representing the second set of captures including a white-point for each capture in the set of captures; and
wherein the data describing the previously calculated probability distribution for the reference illumination includes data describing a probability distribution of the white-points for each capture in the second set of captures under the second reference illumination.

4. The method of claim 3, wherein generating the data describing the previously calculated probability distribution for the reference illumination includes generating data describing a mixture model of the first reference illumination and the second reference illumination.

5. The method of claim 2, wherein calculating the probability distribution of the white-points for each capture in the set of captures under the reference illumination includes
determining an illumination color for each capture in the set of captures, and
calculating a transformation of the determined illumination colors of the set of captures.

6. The method of claim 5, wherein calculating a transformation of the determined illumination colors of the set of captures includes calculating a principal component transformation of the determined illumination colors of the set of captures.

7. The method of claim 1, further comprising determining an estimate of the target illumination based on the computed probability that the target illumination is the reference illumination.

8. The method of claim 1, further comprising:
determining a color correction for the image data based on the calculated probability that the target illumination is the reference illumination.

9. The method of claim 8, wherein the reference illumination is one of a plurality of reference illuminations each associated with a respective value for a color correction parameter, and wherein determining the color correction for the image data includes determining a value for the color correction parameter based on each associated color correction parameter value of the plurality of reference illuminations.

10. The method of claim 8, wherein determining the color correction for the image data includes determining a value of a color correction parameter for the image data based on a value of the color correction parameter for image data representing another capture of an image.

11. The method of claim 1, wherein calculating the probability that the target illumination is the reference illumination is further based on data describing an exposure characteristic of the imaging device.

12. The method of claim 1, further comprising:
detecting that the image data indicates a spatial image flicker; and
wherein calculating the probability that the target illumination is the reference illumination includes calculating based on the detected spatial image flicker.

13. A computer-readable storage medium having stored thereon instructions which when executed by one or more processors cause the one or more processors to perform a method comprising:

obtaining image data representing a capture by an imaging device of an image of a target under a target illumination, the image data including image pixel values corresponding to respective zones of the image of the target;

determining an illumination color of the image, including calculating an average of the image pixel values;

calculating a probability that the target illumination is a reference illumination based on the determined illumination color and data describing a previously calculated probability distribution for the reference illumination; and storing an indication of the calculated probability that the target illumination is the reference illumination.

14. The computer-readable storage medium of claim 13, the method further comprising obtaining data representing a set of captures by an imaging device, wherein each capture in the set of captures is of an image of a reference target in a set of reference targets, wherein each image is of a reference target under the reference illumination, the data representing the set of captures including a white-point for each capture in the set of captures; and generating the data describing the probability distribution for the reference illumination, including calculating a probability distribution of the white-points for each capture in the set of captures.

15. The computer-readable storage medium of claim 14, the method further comprising:

obtaining data representing a second set of captures by an imaging device, wherein each capture in the second set of captures is of an image of a reference target in the set of reference targets, wherein each image is of a reference target under a second reference illumination, the data representing the second set of captures including a white-point for each capture in the set of captures; and wherein the data describing the previously calculated probability distribution for the reference illumination includes data describing a probability distribution of the white-points for each capture in the second set of captures under the second reference illumination.

16. The computer-readable storage medium of claim 14, wherein calculating the probability distribution of the white-points for each capture in the set of captures under the reference illumination includes calculating a principal component transformation of the data representing the set of captures.

17. The computer-readable storage medium of claim 13, wherein the data describing the previously calculated probability distribution for the reference illumination includes a mixture model further describing a probability distribution for a second reference illumination, the method further comprising:

computing a probability that the target illumination is the second reference illumination based on the determined illumination color for the image and the mixture model; and determining an estimate of the target illumination based on the computed probability that the target illumination is the reference illumination and the computed probability that the target illumination is the second reference illumination.

18. The computer-readable storage medium of claim 13, the method further comprising:

determining a color correction for the image data based on the calculated probability that the target illumination is the reference illumination.

19. An apparatus comprising:

an image data receiver to obtain image data representing a capture by an imaging device of an image of a target under a target illumination, the image data including image pixel values corresponding to respective zones of the image of the target;

an illumination color determining means coupled to the image data receiver for determining an illumination color of the image, including means for calculating an average of the image pixel values;

a probability determining means coupled to the illumination color determining means for obtaining an indication of the determined illumination color of the image data and further for accessing data describing a previously calculated probability distribution for the reference illumination, the probability determining means further for calculating a probability that the target illumination is a reference illumination based on the determined illumination color of the image data and the data describing the previously calculated probability distribution for the reference illumination; and a memory to store an indication of the calculated probability that the target illumination is a reference illumination.

20. The apparatus of claim 19, further comprising:

means for obtaining data representing a set of captures by an imaging device, wherein each capture in the set of captures is of an image of a reference target in a set of reference targets, wherein each image is of a reference target under the reference illumination, the data representing the set of captures including a white-point for each capture in the set of captures, and means for generating the data describing the probability distribution for the reference illumination, including means for calculating a probability distribution of the white-points for each capture in the set of captures.

21. The apparatus of claim 20, further comprising:

means for obtaining data representing a second set of captures by an imaging device, wherein each capture in the second set of captures is of an image of a reference target in the set of reference targets, wherein each image is of a reference target under a second reference illumination, the data representing the second set of captures including a white-point for each capture in the set of captures, and wherein the data describing the probability distribution for the reference illumination includes data describing a probability distribution of the white-points for each capture in the second set of captures under the second reference illumination.

22. The apparatus of claim 19, further comprising:

a color correction module to determine a color correction for the image data based on the calculated probability that the target illumination is the reference illumination.

23. The apparatus of claim 22, wherein the reference illumination is one of a plurality of reference illuminations each associated with a respective value for a color correction parameter, and wherein the color correction module to determine the color correction for the image data includes the color correction module to determine a value for the color correction parameter based on each associated color correction parameter value of the plurality of reference illuminations.

24. The apparatus of claim 22, wherein the color correction module to determine the color correction for the image data includes the color correction module to determine a value of a color correction parameter for the image data based on a value of the color correction parameter for image data representing another capture of an image.

25. The apparatus of claim 19, wherein the probability determining means for calculating the probability that the target illumination is the reference illumination further based on data describing an exposure characteristic of the imaging device.

26. The apparatus of claim 19, further comprising:
means for detecting that the image data indicates a spatial image flicker; and
wherein the probability determining means for calculating the probability that the target illumination is the reference illumination further based on the detected spatial image flicker.

27. A system comprising:
an imaging device to generate image data representing a capture of an image of a target under a target illumination, the image data including image pixel values corresponding to respective zones of the image of the target;
an image data receiver coupled to the imaging device to obtain the image data;
an illumination color determining means coupled to the image data receiver for determining an illumination color of the image, including calculating an average of the image pixel values;
a probability determining means coupled to the white point determining means for obtaining an indication of the determined illumination color of the image and data describing a previously calculated probability distribution for the reference illumination, the probability determining means further for calculating a probability that the target illumination is a reference illumination based on the determined illumination color of the image and the data describing the previously calculated probability distribution for the reference illumination; and
a memory to store an indication of the calculated probability that the target illumination is a reference illumination.

28. The system of claim 27, further comprising:
means for obtaining data representing a set of captures by an imaging device, wherein each capture in the set of captures is of an image of a reference target in a set of reference targets, wherein each image is of a reference target under the reference illumination, the data representing the set of captures including a white-point for each capture in the set of captures, and
means for generating the data describing the probability distribution for the reference illumination, including means for calculating a probability distribution of the white-points for each capture in the set of captures.

29. The system of claim 28, further comprising:
means for obtaining data representing a second set of captures by an imaging device, wherein each capture in the second set of captures is of an image of a reference target in the set of reference targets, wherein each image is of a reference target under a second reference illumination, the data representing the second set of captures including a white-point for each capture in the set of captures, and
wherein the data describing the probability distribution for the reference illumination includes data describing a probability distribution of the white-points for each capture in the second set of captures under the second reference illumination.

* * * * *